US009791001B2

(12) United States Patent
Okuda et al.

(10) Patent No.: US 9,791,001 B2
(45) Date of Patent: Oct. 17, 2017

(54) POWER TRANSMITTING APPARATUS FOR VEHICLE

(71) Applicants: Koichi Okuda, Toyota (JP); Atsushi Tabata, Okazaki (JP); Tatsuya Imamura, Okazaki (JP)

(72) Inventors: Koichi Okuda, Toyota (JP); Atsushi Tabata, Okazaki (JP); Tatsuya Imamura, Okazaki (JP)

(73) Assignee: TOYOTA JIDOSHA KABUSHIKI KAISHA, Toyota-shi, Aichi-ken (JP)

( * ) Notice: Subject to any disclaimer, the term of this patent is extended or adjusted under 35 U.S.C. 154(b) by 0 days.

(21) Appl. No.: 14/424,792

(22) PCT Filed: Dec. 18, 2013

(86) PCT No.: PCT/IB2013/002793
§ 371 (c)(1),
(2) Date: Feb. 27, 2015

(87) PCT Pub. No.: WO2014/102579
PCT Pub. Date: Jul. 3, 2014

(65) Prior Publication Data
US 2015/0219169 A1 Aug. 6, 2015

(30) Foreign Application Priority Data
Dec. 27, 2012 (JP) .................. 2012-285383

(51) Int. Cl.
*F16D 41/06* (2006.01)
*F16D 41/069* (2006.01)
(Continued)

(52) U.S. Cl.
CPC ............ *F16D 41/069* (2013.01); *B60K 6/383* (2013.01); *B60K 6/405* (2013.01); *B60K 6/445* (2013.01);
(Continued)

(58) Field of Classification Search
CPC ......... B60K 6/383; B60K 6/405; F16H 48/11; F16D 2041/0601; F16D 41/07; Y02T 10/626; Y02T 10/6256
See application file for complete search history.

(56) References Cited

U.S. PATENT DOCUMENTS

| | | | |
|---|---|---|---|
| 2013/0017915 A1* | 1/2013 | Miyata | B60K 6/365 475/5 |
| 2013/0017916 A1* | 1/2013 | Sada | F16D 41/06 475/5 |

(Continued)

FOREIGN PATENT DOCUMENTS

| | | |
|---|---|---|
| JP | 2002-103999 A | 4/2002 |
| JP | 2010-269718 A | 12/2010 |
| JP | 2012-225371 A | 11/2012 |

*Primary Examiner* — Stacey Fluhart
(74) *Attorney, Agent, or Firm* — Sughrue Mion, PLLC

(57) ABSTRACT

Power from an engine of a hybrid vehicle is input to an input shaft (302) of a power split device. A one-way clutch (500) and the power split device are housed in a housing (600). A cover member (700) is provided inside the housing (600). The one-way clutch (500) includes an outer race (510), an inner race (520), and a sprag (530). The outer race (510) is spline-engaged to a protruding portion (701) of the cover member (700). The inner race (520) is spline-engaged to the input shaft (302), and is rotatably supported by the protruding portion (702) of the cover member (700) via a bushing (522). The input shaft (302) is rotatably supported by the cover member (700) via a first bearing (340), a rotating member (322A), and a second bearing (350).

3 Claims, 4 Drawing Sheets

(51) Int. Cl.
*B60K 6/383* (2007.10)
*B60K 6/405* (2007.10)
*B60K 6/445* (2007.10)
*F16H 48/11* (2012.01)

(52) U.S. Cl.
CPC ........... *F16H 48/11* (2013.01); *Y02T 10/6239* (2013.01); *Y10S 903/913* (2013.01); *Y10S 903/952* (2013.01)

(56) References Cited

U.S. PATENT DOCUMENTS

| | | | | |
|---|---|---|---|---|
| 2013/0109523 A1* | 5/2013 | Shibata | .................. | B60K 6/445 |
| | | | | 475/5 |
| 2013/0274047 A1* | 10/2013 | Gotz | ...................... | B60K 6/383 |
| | | | | 475/5 |
| 2014/0171247 A1* | 6/2014 | Puiu | ...................... | B60K 6/387 |
| | | | | 475/5 |
| 2014/0228166 A1* | 8/2014 | Heap | .................... | B60W 20/00 |
| | | | | 477/5 |
| 2015/0136557 A1* | 5/2015 | Bastel | .................... | F16D 41/06 |
| | | | | 192/42 |

* cited by examiner

POWER TRANSMITTING APPARATUS FOR VEHICLE

BACKGROUND OF THE INVENTION

1. Field of the Invention

The invention relates to a power transmitting apparatus for a vehicle.

2. Description of Related Art

Japanese Patent Application Publication No. 2010-269718 (JP 2010-269718 A) describes a structure in a hybrid vehicle provided with an engine, a first rotary electric machine, and a second rotary electric machine. The structure includes i) a planetary gear set that has a sun gear that is connected to the first rotary electric machine, a ring gear that is connected to the second rotary electric machine, and a carrier that is connected to the engine, and ii) a one-way clutch with the first rotary electric machine and the second rotary electric machine:

SUMMARY OF THE INVENTION

As described in JP 2010-269718 A, in a hybrid vehicle provided with a one-way clutch with the first rotary electric machine and the second rotary electric, machine, when the one-way clutch is arranged in a position near an output shaft of the engine, the durability of the one-way clutch may decrease due to vibration and the like transmitted from the engine.

The invention improves the durability of a one-way clutch in a vehicle provided with an engine, a first rotary electric machine, a second rotary electric machine, and a one-way clutch with the first rotary electric machine and the second rotary electric machine.

One aspect of the invention relates to a power transmitting apparatus for a vehicle that includes an engine, a first rotary electric machine, and a second rotary electric machine. This power transmitting apparatus includes a differential gear unit, a one-way clutch, a housing, a first cover member, a first bearing, and a second bearing. The differential gear unit has a first rotating element, a second rotating element, and a third rotating element. The first rotating element is connected to the first rotary electric machine. The second rotating element is connected to the second rotary electric machine. The third rotating element is connected to an input shaft into which power from the engine is input. The one-way clutch is arranged between the engine and the first rotary electric machine. The one-way clutch is configured to allow the input shaft to rotate in one direction and inhibit the input shaft from rotating in the other direction. The one-way clutch includes an inner race and an outer race. The inner race is spline-engaged to the input shaft. The one-way clutch, the first rotary electric machine, the differential gear unit, and the second rotary electric machine are housed in the housing. The first cover member is arranged inside of the housing and is fixed to the housing. The first cover member is spline-engaged to the outer race. The input shaft is rotatably supported by the first rotating element via the first bearing. The first rotating element is rotatably supported by the first cover member via the second bearing.

The power transmitting apparatus described above may also include a bushing. The first cover member may have a protruding portion. The protruding portion may extend to a position on a radially inner side of a radially outer side end portion of the inner race. The protruding portion may rotatably support the radially outer side end portion of the inner race via the bushing. The protruding portion may be configured to restrict movement of the inner race toward the radially inner side.

In the power transmitting apparatus described above, at an engaging portion where the one-way clutch and the input shaft are spline-engaged, a clearance between the one-way clutch and the input shaft in a radial direction may be larger than a sum of an amount of vibration of the input shaft in the radial direction and an amount of vibration of the inner race in the radial direction.

In the power transmitting apparatus described above, the clearance of the engaging portion in the radial direction may be larger than a sum of the amount of vibration of the input shaft in the radial direction, the amount of vibration of the inner race in the radial direction, and an amount of vibration of the outer race in the radial direction.

In the power transmitting apparatus described above, the first cover member and a second cover member may be configured to restrict movement of the outer race in an axial direction thereof.

The power transmitting apparatus described above may also include a second cover member that is fastened to the first cover member. The first cover member and the second cover member may be configured to restrict movement of the outer race in an axial direction thereof.

In the power transmitting apparatus described above, the outer race, the inner race, and the input shaft may be supported by the first cover member.

The invention makes it possible to improve the durability of a one-way clutch in a vehicle provided with an engine, a first rotary electric machine, a second rotary electric machine, and a one-way clutch for driving the vehicle with the first rotary electric machine and the second rotary electric machine.

BRIEF DESCRIPTION OF THE DRAWINGS

Features, advantages, and technical and industrial significance of exemplary embodiments of the invention will be described below with reference to the accompanying drawings, in which like numerals denote like elements, and wherein.

DETAILED DESCRIPTION OF EMBODIMENTS

Figure 1:
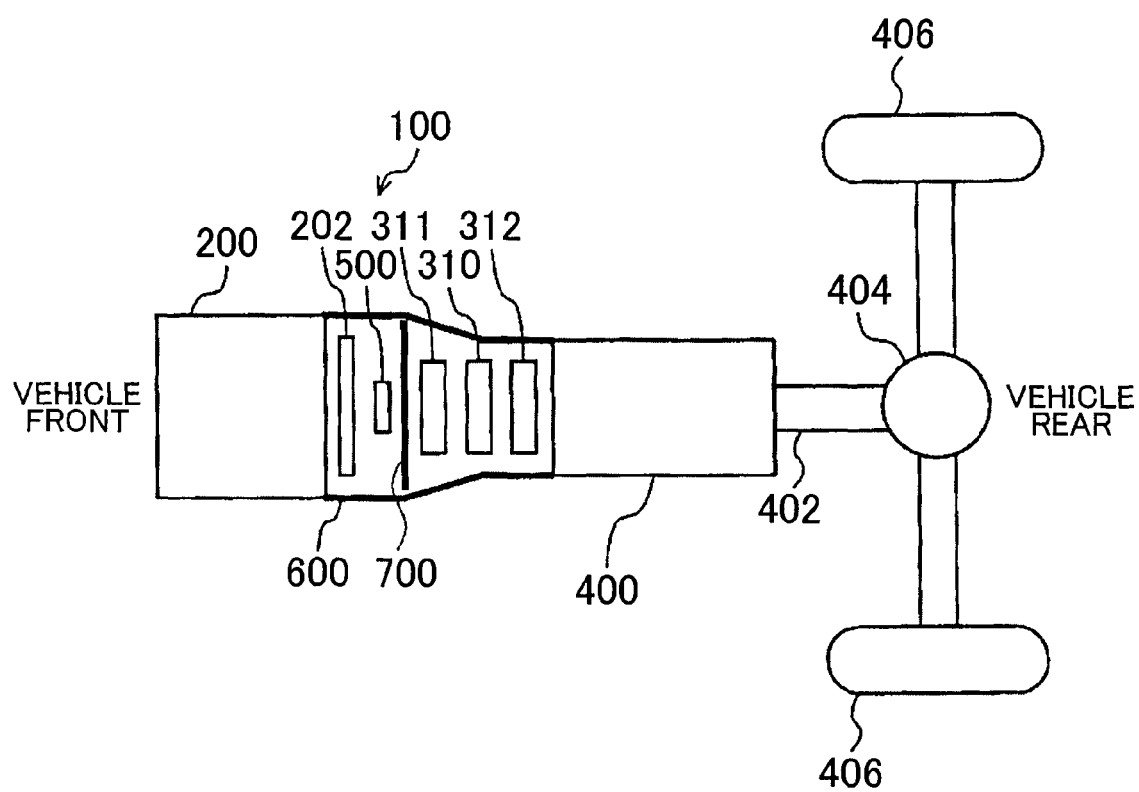
FIG. 1 is a block diagram schematically showing a hybrid vehicle.

Hereinafter, example embodiments of the invention will be described with reference to the accompanying drawings. In the description below, like parts will be denoted by like reference characters and referred to by the same nomenclature and have the same functions. Therefore, detailed descriptions of those parts will not be repeated.

FIG. 1 is a block diagram schematically showing a hybrid vehicle according to one example embodiment of the invention. This hybrid vehicle is an FR (Front engine Rear drive) vehicle, but it may also be a vehicle other than an FR vehicle. The vehicle described as a hybrid vehicle in the example embodiment also includes an electric vehicle provided with a cruising range extending function (i.e., a range extender) in which an engine is used mainly to generate electricity.

The hybrid vehicle includes a hybrid system 100, an automatic transmission (multi-speed transmission) 400, a propeller shaft 402, a differential gear 404, and rear wheels 406. The hybrid system 100 includes an engine 200, a damper 202, a power split device (a differential gear unit) 310; a first motor-generator 311, a second motor-generator 312, and a one-way clutch 500.

As shown in FIG. 1, the engine 200, the damper 202, the one-way clutch 500, the first motor-generator 311, the power split device 310, the second motor-generator 312, and the automatic transmission 400 are all arranged in this order from the front of the vehicle toward the rear of the vehicle. The component parts from the damper 202 to the second motor-generator 312 (more specifically, the damper 202, the one-way clutch 500, the first motor-generator 311, the power split device 310, and the second motor-generator 312) are housed inside of a housing 600.

A cover member 700 that is fixed to the housing 600 is provided inside the housing 600. The internal structure of the housing 600 will be described in detail later.

The automatic transmission 400 is connected to an output shaft of the hybrid system 100. Driving force output from the automatic transmission 400 is transmitted to the left and right rear wheels 406 via the propeller shaft 402 and the differential gear 404.

Figure 2:
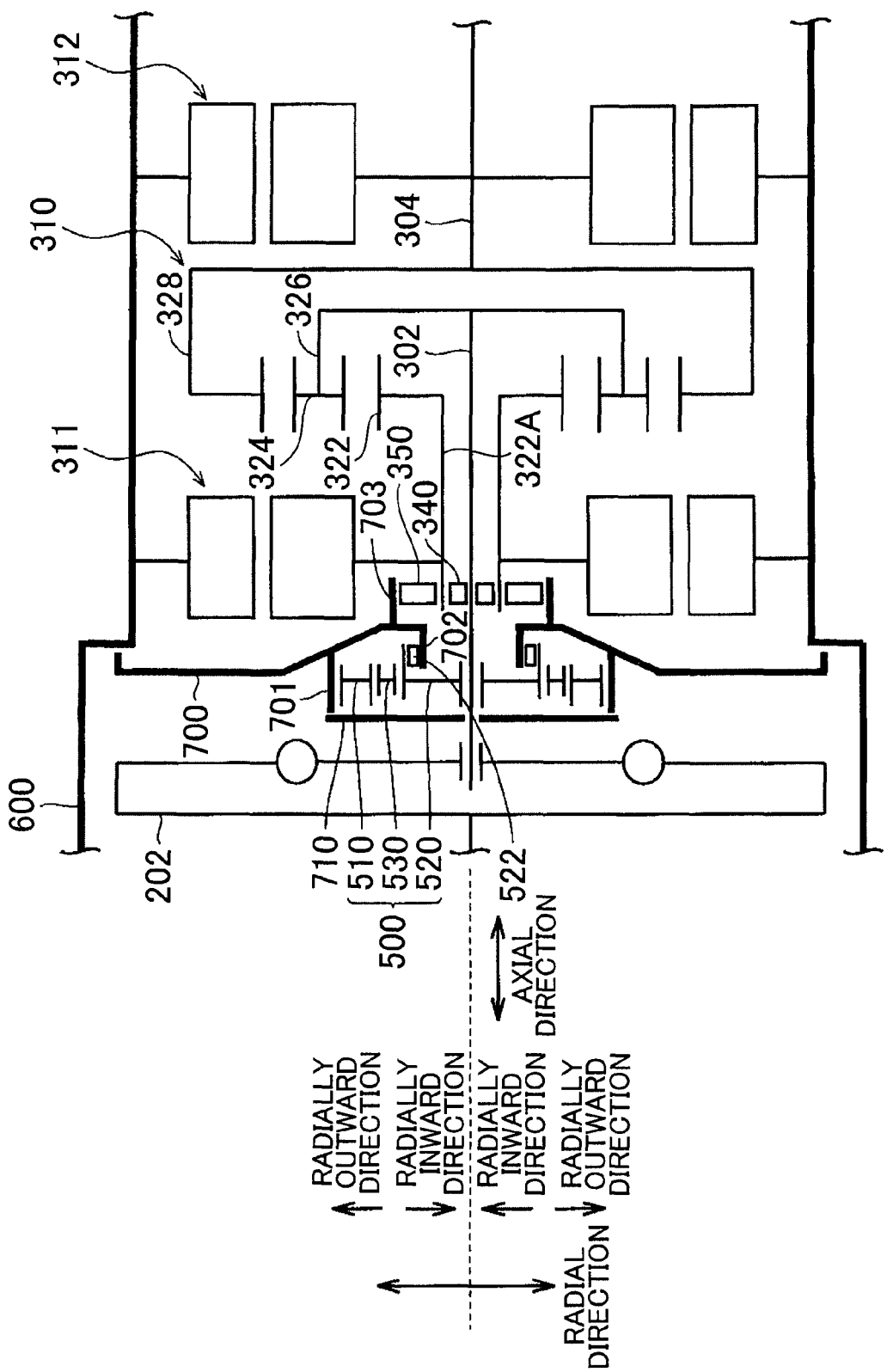
FIG. 2 is a view showing a frame format of the internal structure of a housing.
Figure 3:
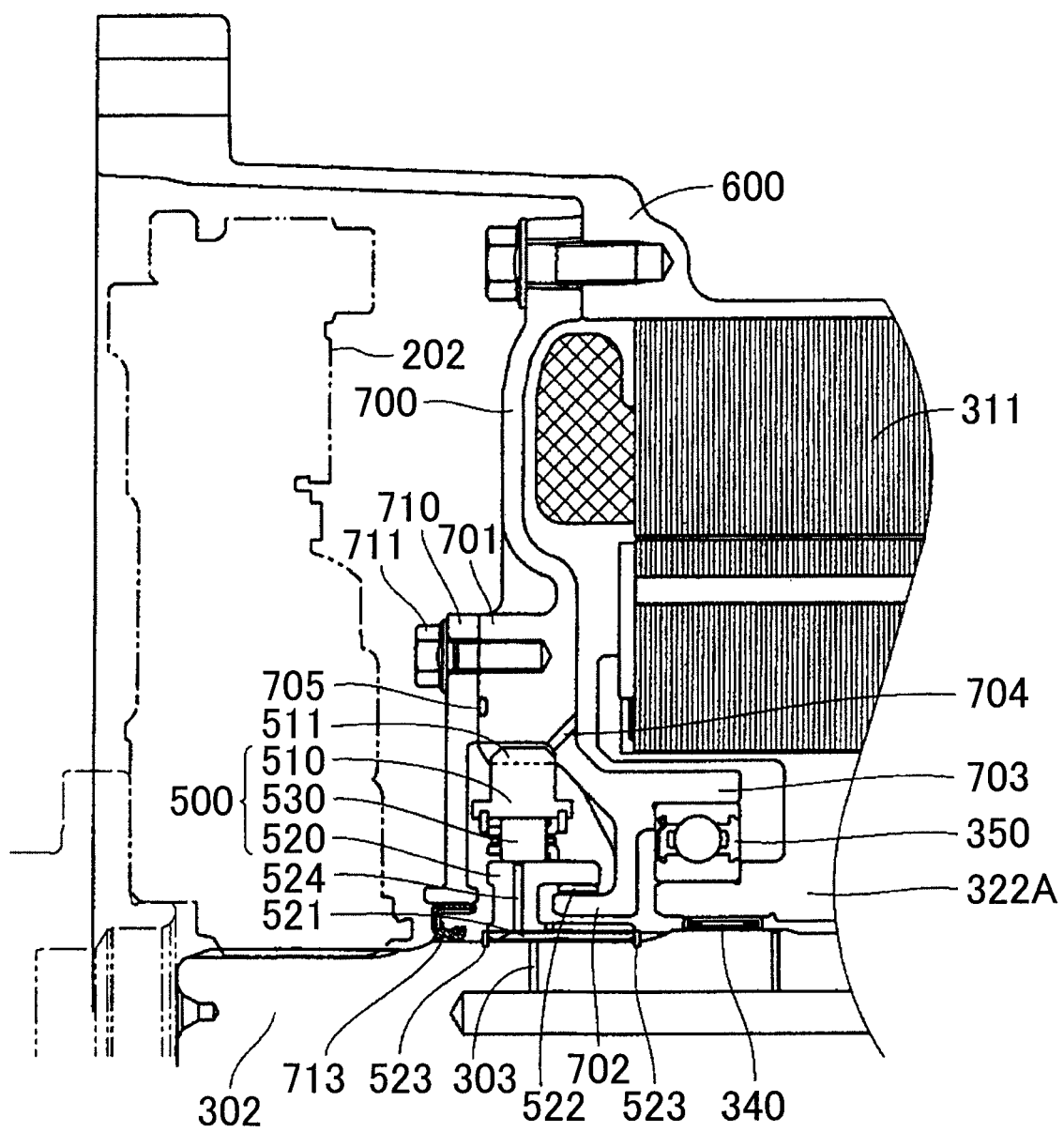
FIG. 3 is a view of the detailed structure around a one-way clutch.

FIG. 2 is a view showing a frame format of the internal structure of the housing 600. FIG. 3 is a view of the detailed structure around the one-way clutch 500. The hybrid system, 100 will now be described in more detail with reference to FIGS. 2 and 3.

Power from the engine 200 is input to an input shaft 302 of the power split device 310 via the damper 202. The damper 202 and the input shaft 302 are connected together by spline-engagement.

The power split device 310 distributes the power from the engine 200 that is input to the input shaft 302, to the first motor-generator 311 and an output shaft 304.

The power split device 310 includes the input shaft 302, a sun gear 322, pinion gears 324, a carrier 326, a ring gear 328, and the output shaft 304. The carrier 326 is connected to the engine 200 via the input shaft 302, and rotatably and revolvably supports the pinion gears 324. The sun gear 322 is connected to a rotor of the first motor-generator 311 via a rotating member 322A. The ring gear 328 is in mesh with the sun gear 322 via the pinion gears 324, and is connected to an input shaft, not shown, of the automatic transmission 400 and a rotor of the second motor-generator 312 via the output shaft 304.

The power split device 310 functions as a differential gear unit by the sun gear 322, the carrier 326, and the ring gear 328 rotating relative to each another. The power from the engine 200 is distributed to the first motor-generator 311 and the output shaft 304 by this differential function of the power split device 310.

The first motor-generator 311 and the second motor-generator 312 are both three-phase alternating current rotary electric machines. The first motor-generator 311 is able to generate power (i.e., electric power) using the power from the engine 200 that is input from the power split device 310. The second motor-generator 312 is able to drive using the electric power generated by the first motor-generator 311. The rotor of the second motor-generator 312 is connected to the output shaft 304 of the power split device 310. The output shaft 304 of the power split device 310 is connected to an input shaft, not shown, of the automatic transmission 400.

As shown in FIG. 2, the power split device 310 is provided between the first motor-generator 311 and the second motor-generator 312. Meanwhile, the one-way clutch 500 is provided between the damper 202 (the engine 200) and the first motor-generator 311. That is, the one-way clutch 500 is arranged in a position closer to the engine 200 than the first motor-generator 311 is.

The cover member 700 is fixed to the housing 600 by bolts. The cover member 700 extends in a direction substantially orthogonal to the input shaft 302 (hereinafter also referred to as the "radial direction"), and divides the inside of the housing 600.

The cover member 700 has a main body portion that extends in the radial direction, and protruding portions 701 to 703 that extend from the main body portion in a direction substantially parallel to the input shaft 302 (hereinafter also referred to as the "axial direction"). The protruding portion 701 extends in a cylindrical shape from a main body portion-side surface of the cover member 700 toward the front of the vehicle. The protruding portion 702 extends from a radially inner side end portion of the main body portion of the cover member 700 to a position to the radially inner side of a radially outer side end portion of an inner race 520 of the one-way clutch 500. The protruding portion 703 extends in a cylindrical shape from the main body portion-side surface of the cover member 700 toward the rear of the vehicle.

A mini-cover member 710 that extends in the radial direction is fastened by a bolt 711 to a tip end of the protruding portion 701. The inside of the housing 600 is divided by the cover member 700 and the mini-cover member 710 into a space where the damper 202 is housed (hereinafter referred to as a "damper chamber"), a space where the one-way clutch 500 is housed (hereinafter referred to as a "clutch chamber"), and a space where the first motor-generator 311, the power split device 310, and the second motor-generator 312 are housed (hereinafter referred to as a "motor chamber").

Lubricating oil from oil holes 303 provided in the input shaft 302 is supplied by centrifugal force to the clutch chamber. An oil seal 713 for, ensuring oil tightness of the clutch chamber is provided between the mini-cover member 710 and the input shaft 302. Also, an O-ring 705 is provided on a tip end of the protruding portion 701 (the surface contacting the mini-cover member 710). Lubricating oil supplied from the oil holes 303 to the clutch chamber then moves by centrifugal force to the motor chamber through an oil hole 704 provided in the cover member 700. An oil passage 524 for supplying lubricating oil to a sprag 530 is provided inside the inner race 520.

The one-way clutch 500 includes an outer race 510, the inner race 520, and the sprag 530.

The outer race 510 is spline-engaged to the protruding portion 701 of the cover member 700 by a splined portion 511. As a result, movement of the outer race 510 in a radially outward direction (i.e., a direction away from the input shaft 302) is restricted by the protruding portion 701 of the cover member 700.

Movement of the outer race 510 in the axial direction is restricted by the cover member 700 and the mini-cover member 710. This kind of arrangement obviates the need for a snap ring that positions the outer race 510 in the axial direction, thereby enabling the number of parts to be reduced.

The inner race 520 is spline-engaged to the input shaft 302 by a splined portion 521. The inner race 520 is rotatably supported by the protruding portion 702 of the cover member 700 via a bushing 522. As a result, movement of the inner race 520 in a radially inward direction (i.e., a direction toward the input shaft 302) is restricted by the protruding portion 702 of the cover member 700. Movement of the inner race 520 in the axial direction is restricted by a slip ring 523.

The one-way clutch 500 allows the input shaft 302 to rotate in one direction (a forward direction) and inhibits the input shaft 302 from rotating in the other-direction (a reverse direction). More specifically, when the inner race 520 attempts to rotate in one direction (the forward direction) with respect to the outer race 510 that is restricted from rotating by the cover member 700, the sprag 530 disengages and the inner race 520 is allowed to rotate in the one direction. On the other hand, when the inner race 520 attempts to rotate in the other direction (the reverse direction), the sprag 530 engages with the outer race 510 and the inner race 520, and the inner race 520 becomes fixed to the outer race 510.

Furthermore, the input shaft 302 is rotatably supported, via a first bearing 340, by the rotating member 322A that connects the rotor of the first motor-generator 311 to the sun gear 322. Also, the rotating member 322A is rotatably supported by the protruding portion 703 of the cover member 700 via a second bearing 350. That is, the input shaft 302 is rotatably supported by the protruding portion 703 of the cover member 700 via the first bearing 340, the rotating member 322A, and the second bearing 350. As a result, movement of the input shaft 302 in the radially outward direction is restricted by the protruding portion 703 of the cover member 700.

In this example embodiment, the one-way clutch 500 may be arranged in a position near the engine 200, so vibration and the like from the engine 200 tends to be transmitted to the one-way clutch 500. However, in this example embodiment, as described above, the outer race 510 and the inner race 520 of the one-way clutch 500, and the input shaft 302, are all supported by the same cover member 700. That is, the outer race 510 is supported by the cover member 700 at the splined portion 511, the inner race 520 is supported by the cover member 700 via the bushing 522, and the input shaft 302 is supported by the cover member 700 via the first bearing 340, the rotating member 322A, and the second bearing 350. As a result, the support accuracy of the one-way clutch 500 is improved and the amount of vibration of each member is able to be reduced, so the durability of the one-way clutch 500 is able to be improved.

In particular, in this example embodiment, the movement of the one-way clutch 500 in the radially inward direction and the movement of the input shaft 302 in the radially outward direction are restricted by the same cover member 700. Therefore, the sum of the amount of vibration of the one-way clutch 500 in the radially inward direction and the amount of vibration of the input shaft 302 in the radially outward direction is able to be accurately restricted. Accordingly, force that acts in the radial direction on the one-way clutch 500 is able to be suppressed, so the durability of the one-way clutch 500 and the parts therearound is able to be appropriately improved. Furthermore, movement of the outer race 510 in the radially outward direction is restricted by the same cover member 700. Therefore, backlash between the one-way clutch 500 and the cover member 700 is also able to be accurately avoided.

Figure 4:
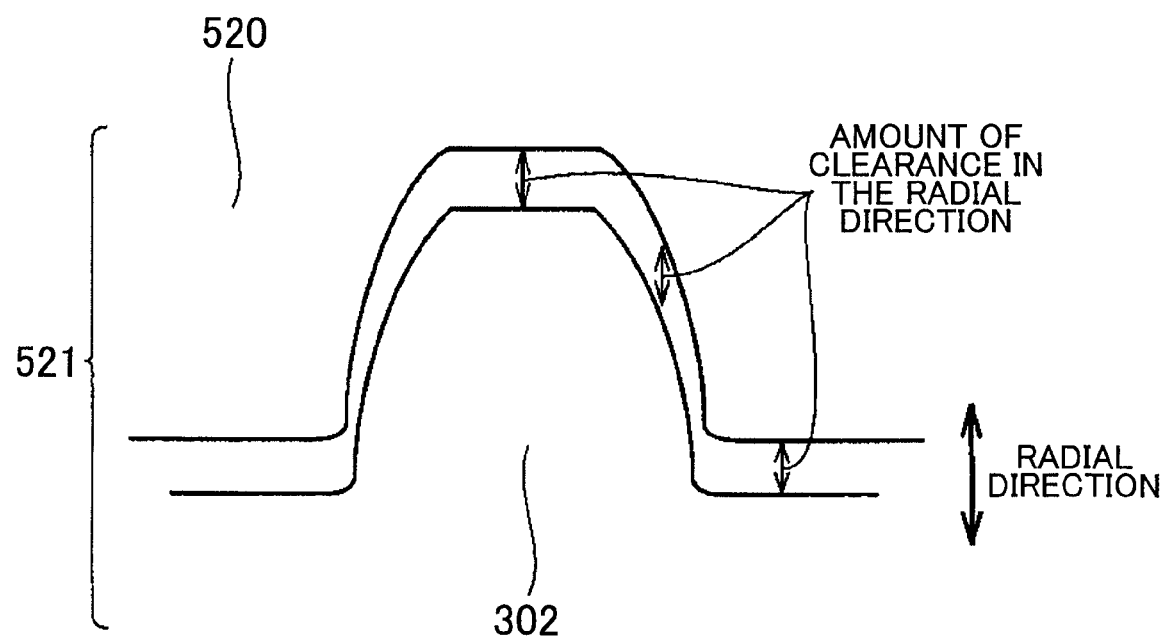
FIG. 4 is an enlarged view of a splined portion of an inner race.

FIG. 4 is an enlarged view of the splined portion 521 of the inner race 520 and the input shaft 302, viewed from the axial direction. The amount of clearance of the splined portion 521 in the radial direction is set to be a value that is larger than the sum of the amount of vibration of the inner race 520 in the radial direction and the amount of vibration of the input shaft 302 in the radial direction. Moreover, the amount of clearance of the splined portion 521 in the radial direction is set to be a value that is larger than the sum of the amount of vibration of the inner race 520 in the radially inward direction, the amount of vibration of the input shaft 302 in the radial direction, and the amount of vibration of the outer race 510 in the radial direction. Therefore, even if the vibration of the input shaft 302 in the radial direction becomes large, the force in the radial direction that acts on the inner race 520 of the one-way clutch 500 can be appropriately suppressed. Hence, the durability of the one-way clutch 500 is able to be more appropriately improved.

As described above, in this example embodiment, the outer race 510 and the inner race 520 of the one-way clutch 500, and the input shaft 302, are supported by the same cover member 700. As a result, the durability of the one-way clutch 500 is able to be improved.

The example embodiments disclosed herein are in all respects merely examples and should in no way be construed as limiting. The scope, of the invention is indicated not by the foregoing description but by the scope of the claims for patent, and is intended to include all modifications that are within the scope and meanings equivalent to the scope of the claims for patent.

The invention claimed is:

1. A power transmitting apparatus for a vehicle, the vehicle including an engine, a first rotary electric machine, and a second rotary electric machine, the power transmitting apparatus comprising:
   a differential gear unit that has a first rotating element, a second rotating element, and a third rotating element, the first rotating element being connected to the first rotary electric machine, the second rotating element being connected to the second rotary electric machine, and the third rotating element being connected to an input shaft into which power from the engine is input;
   a one-way clutch that is arranged between the engine and the first rotary electric machine, the one-way clutch being configured to allow the input shaft to rotate in one direction and inhibit the input shaft from rotating in the other direction, the one-way clutch including an inner race and an outer race, the inner race being spline-engaged to the input shaft,
   a housing within which are housed the one-way clutch, the first rotary electric machine, the differential gear unit, and the second rotary electric machine;
   a first cover member that is arranged inside of the housing and is fixed to the housing, the first cover member being spline-engaged to the outer race and configured to restrict movement of the outer race in a first axial direction of the input shaft;
   a first bearing via which the input shaft is rotatably supported in a radial direction of the input shaft by the first rotating element;
   a second bearing via which the first rotating element is rotatably supported by the first cover member; and
   a second cover member fastened to a side surface of the first cover member facing the engine, the second cover member being configured to restrict movement of the outer race in a second axial direction that is opposite to the first axial direction, wherein the second axial direction is an axial direction toward the engine.

2. The power transmitting apparatus according to claim 1, wherein the outer race, the inner race, and the input shaft are supported by the first cover member.

3. A power transmitting apparatus for a vehicle, the vehicle including an engine, a first rotary electric machine, and a second rotary electric machine, the power transmitting apparatus comprising:

a differential gear unit that has a first rotating element, a second rotating element, and a third rotating element, the first rotating element being connected to the first rotary electric machine, the second rotating element being connected to the second rotary electric machine, and the third rotating element being connected to an input shaft into which power from the engine is input;

a one-way clutch that is arranged between the engine and the first rotary electric machine, the one-way clutch being configured to allow the input shaft to rotate in one direction and inhibit the input shaft from rotating in the other direction, the one-way clutch including an inner race and an outer race, the inner race being spline-engaged to the input shaft, a housing within which are housed the one-way clutch, the first rotary electric machine, the differential gear unit, and the second rotary electric machine;

a first cover member that is arranged inside of the housing and is fixed to the housing, the first cover member being spline-engaged to the outer race and configured to restrict movement of the outer race in a first axial direction of the input shaft;

a first bearing via which the input shaft is rotatably supported in a radial direction of the input shaft by the first rotating element;

a second bearing via which the first rotating element is rotatably supported by the first cover member;

a second cover member fastened to the first cover member, the second cover member being configured to restrict movement of the outer race in a second axial direction that is opposite to the first axial direction; and a bushing, wherein the first cover member has a protruding portion;

the protruding portion extends to a position on a radially inner side of a radially outer side end portion of the inner race;

the protruding portion rotatably supports the radially outer side end portion of the inner race via the bushing; and the protruding portion is configured to restrict movement of the inner race toward the radially inner side.

* * * * *